(12) United States Patent
Elder et al.

(10) Patent No.: US 11,188,759 B2
(45) Date of Patent: Nov. 30, 2021

(54) SYSTEM AND METHOD FOR AUTOMATED VIDEO PROCESSING OF AN INPUT VIDEO SIGNAL USING TRACKING OF A SINGLE MOVEABLE BILATERALLY-TARGETED GAME-OBJECT

(71) Applicants: James Harvey Elder, Toronto (CA); Hemanth Pidaparthy, Toronto (CA)

(72) Inventors: James Harvey Elder, Toronto (CA); Hemanth Pidaparthy, Toronto (CA)

( * ) Notice: Subject to any disclaimer, the term of this patent is extended or adjusted under 35 U.S.C. 154(b) by 0 days.

(21) Appl. No.: 16/732,422

(22) Filed: Jan. 2, 2020

(65) Prior Publication Data

US 2020/0218901 A1 Jul. 9, 2020

Related U.S. Application Data

(60) Provisional application No. 62/787,904, filed on Jan. 3, 2019.

(51) Int. Cl.
*G06K 9/00* (2006.01)
*G06T 7/70* (2017.01)
*G06K 9/62* (2006.01)

(52) U.S. Cl.
CPC ..... *G06K 9/00724* (2013.01); *G06K 9/00744* (2013.01); *G06T 7/70* (2017.01);
(Continued)

(58) Field of Classification Search
None
See application file for complete search history.

(56) References Cited

U.S. PATENT DOCUMENTS

| 9,298,986 B2 | 3/2016 | Ferlatte et al. | |
| 2020/0035019 A1* | 1/2020 | Cappello | A63F 13/497 |
| 2020/0404174 A1* | 12/2020 | Taxbol | H04N 5/247 |

OTHER PUBLICATIONS

C. Chen, O. Wang, S. Heinzle, P. Carr, A. Smolic and M. Gross, "Computational sports broadcasting: Automated director assistance for live sports," 2013 IEEE International Conference on Multimedia and Expo (ICME), San Jose, CA, 2013, pp. 1-6, doi: 10.1109/ICME. 2013.6607445. (Year: 2013).*

(Continued)

*Primary Examiner* — Justin P. Misleh
(74) *Attorney, Agent, or Firm* — Bhole IP Law; Anil Bhole; Marc Lampert

(57) ABSTRACT

There is provided a system and method for automated video processing of an input video signal using tracking of a single moveable bilaterally-targeted game-object involved in a team-based sporting event. The method includes: receiving the input video signal; analyzing the input video signal for one or more contextual feature maps; coding the one or more contextual feature maps; using a trained machine learning model, determining estimated coordinates of the single moveable bilaterally-targeted game-object for each group of one or more frames of the input video signal, the machine learning model receiving the coded one or more contextual feature maps as features to the machine learning model, the machine learning model trained using training data including a plurality of previously recorded training video signals each with associated coded one or more contextual feature maps, the training data further including ground truth data including screen coordinates of the single moveable bilaterally-targeted game-object.

20 Claims, 18 Drawing Sheets

(52) U.S. Cl.
CPC ......... *G06K 9/6217* (2013.01); *G06K 9/6267* (2013.01); *G06T 2207/20081* (2013.01); *G06T 2207/20084* (2013.01); *G06T 2207/30221* (2013.01); *G06T 2207/30224* (2013.01)

(56) References Cited

OTHER PUBLICATIONS

T. Qazi, P. Mukherjee, S. Srivastava, B. Lail and N. R. Chauhan, "Automated ball tracking in tennis videos," 2015 Third International Conference on Image Information Processing (ICIIP), Waknaghat, 2015, pp. 236-240, doi: 10.1109/ICIIP.2015.7414772. (Year: 2015).*

V. Renò, N. Mosca, R. Marani, M. Nitti, T. D'Orazio and E. Stella, "Convolutional Neural Networks Based Ball Detection in Tennis Games," 2018 IEEE/CVF Conference on Computer Vision and Pattern Recognition Workshops (CVPRW), Salt Lake City, UT, 2018, pp. 1839-18396, doi: 10.1109/CVPRW.2018.00228. (Year: 2018).*

Xinchao Wang, Vitaly Ablavsky, Horesh Ben Shitrit, Pascal Fua, Take your eyes off the ball: Improving ball-tracking by focusing on team play, Computer Vision and Image Understanding, vol. 119, 2014, pp. 102-115, ISSN 1077-3142, doi: 10.1016/j.cviu.2013.11.010. (Year: 2014).*

Kamble, P.R., Keskar, A.G. & Bhurchandi, K.M. Ball tracking in sports: a survey. Artif Intell Rev 52, 1655-1705 (2019). doi: 10.1007/s10462-017-9582-2. (Year: 2019).*

Y. Ariki, S. Kubota, and M. Kumano. Automatic production system of soccer sports video by digital camera work based on situation recognition. In IEEE International Symposium on Multimedia, pp. 851-860, 2006.

K. Bonnen, A. Huk, and L. Cormack. Dynamic mechanisms of visually guided 3d motion tracking. Journal of Neurophysiology, 118:1515-1531, 2017.

B. Chakraborty and S. Meher. A real-time trajectory-based ball detection-and-tracking framework for basketball video. Journal of Optics, 42(2):156-170, 2013.

H. Chen, M. Tien, Y. Chen, W. Tsai, and S. Lee. Physics-based ball tracking and 3d trajectory reconstruction with applications to shooting location estimation in basketball video. Journal of Visual Communication and Image Representation, 20(3):204-216, 2009.

J. Chen and P. Carr. Mimicking human camera operators. In IEEE Winter Conference on Applications of Computer Vision, pp. 215-222, 2015.

J. Chen, H. M. Le, P. Carr, Y. Yue, and J. J. Little. Learning online smooth predictors for realtime camera planning using recurrent decision trees. In IEEE Conference on Computer Vision and Pattern Recognition, pp. 4688-4696, 2016.

S. Daigo and S. Ozaws. Automatic pan control system for broadcasting ball games based on audience's face direction. In Proceedings of the 12th Annual ACM International Conference on Multimedia, pp. 444-447, 2004.

N. Dalal and B. Triggs. Histograms of oriented gradients for human detection. In IEEE Conference on Computer Vision and Pattern Recognition, pp. 886-893, 2005.

G. Farnebäck. Two-frame motion estimation based on polynomial expansion. In Scandinavian Conference on Image analysis, pp. 363-370, 2003.

P. Felsen, P. Agrawal, and J. Malik. What will happen next? forecasting player moves in sports videos. In IEEE Conference on Computer Vision and Pattern Recognition, pp. 3342-3351, 2017.

V. R. Gaddam, R. Eg, R. Langseth, C. Griwodz, and P. Halvorsen. The cameraman operating my virtual camera is artificial: Can the machine be as good as a human? ACM Transactions on Multimedia Computing, Communications, and Applications, 11(4):56, 2015.

G. Thomas, R. Gade, T. B. Moeslund, P. Carr, and A. Hilton. Computer vision for sports: Current applications and research topics. Computer Vision and Image Understanding, 159:3-18, 2017.

X. Wang, E. Türetken, F. Fleuret, and P. Fua. Tracking interacting objects optimally using integer programming. In European Conference on Computer Vision, pp. 17-32, 2014.

X. Wang, E. Turetken, F. Fleuret, and P. Fua. Tracking interacting objects using intertwined flows. IEEE Transactions on Pattern Analysis and Machine Intelligence, 38(11):2312-2326, 2016.

X. Wei, L. Sha, P. Lucey, P. Carr, S. Sridharan, and I. Matthews. Predicting ball ownership in basketball from a monocular view using only player trajectories. In IEEE International Conference on Computer Vision Workshops, pp. 63-70, 2015.

M. Yakut and N. Kehtamavaz. Ice-hockey puck detection and tracking for video highlighting. Signal, Image and Video Processing, 10(3):527-533, 2016.

F. Yan, W. Christmas, and J. Kittler. Ball tracking for tennis video annotation. In Computer Vision in Sports, pp. 25-45. 2014.

A. Hilton, J. Guillemaut, J. Kilner, O. Grau, and G. Thomas. Free-viewpoint video for TV sport production. In Image and Geometry Processing for 3-D Cinematography, pp. 77-106. 2010.

K. Kim, M. Grundmann, A. Shamir, I. Matthews, J. Hodgins, and I. Essa. Motion fields to predict play evolution in dynamic sport scenes. In IEEE Conference on Computer Vision and Pattern Recognition, pp. 840-847, 2010.

K. Kim, D. Lee, and I. Essa. Detecting regions of interest in dynamic scenes with camera motions. In IEEE Conference on Computer Vision and Pattern Recognition, pp. 1258-1265, 2012.

M. Leo, N. Mosca, P. Spagnolo, P. L. Mazzeo, T. D'Orazio, and A. Distante. Real-time multiview analysis of soccer matches for understanding interactions between ball and players. In International Conference on Image and Video Retrieval, pp. 525-534, 2008.

A. Maksai, X. Wang, and P. Fua. What players do with the ball: a physically constrained interaction modeling. In IEEE Conference on Computer Vision and Pattern Recognition, pp. 972-981, 2016.

J. Ren, J. Orwell, G. A. Jones, and M. Xu. Tracking the soccer ball using multiple fixed cameras. Computer Vision and Image Understanding, 113(5):633-642, 2009.

D. P. Kingma and J. Ba. Adam: A method for stochastic optimization. arXiv preprint arXiv:1412.6980, 2014.

A. Krizhevsky and G. Hinton. Convolutional deep belief networks on cifar-10. Unpublished manuscript, 40(7), 2010.

A. Krizhevsky, I. Sutskever, and G. E. Hinton. Imagenet classification with deep convolutional neural networks. In Advances in neural information processing systems, pp. 1097-1105, 2012.

J. Liu, P. Carr, R. T. Collins, and Y. Liu. Tracking sports players with context-conditioned motion models. In IEEE Conference on Computer Vision and Pattern Recognition, pp. 1830-1837, 2013.

E. Rossi and A. Roorda. The relationship between visual resolution and cone spacing in the human fovea. Nature Neuroscience, 13(2): 156-157, 2010.

Kamble, P. R.; Keskar, A. G.; and Bhurchandi, K. M. 2019. Ball tracking in sports: a survey. Arlilicial Intelligence Review 52(3):1655-1705.

Chen, C.; Wang, O.; Heinzle, S.; Carr, P.; Smolic, A.; and Gross, M. 2013. Computational sports broadcasting Automated director assistance for live sports. In Multimedia and Expo (ICME), 2013 IEEE International Conference on, 1-6. IEEE.

Vito Reno, Nicola Mosca, Roberto Marani, Massimiliano Nitti, Tiziana D'Orazio, and Ettore Stella, "Convolutional neural networks based ball detection in tennis games," in Proceedings of the IEEE Conference on Computer Vision and Pattern Recognition Workshops, 2018, pp. 1758-1764.

Yan, Fly & Kittler, J. (2005). A Tennis Ball Tracking Algorithm for Automatic Annotation of Tennis Match. British Machine Vision Conference 10.5244/C.19.67.

Qazi, T., Mukherjee, P., Srivastava, S., Lall, B. and Chauhan, N. R. (2015) 'Automated ball tracking in tennis videos', 2015 Third International Conference on Image Information Processing (ICIIP), pp. 236-240 [Online], DOI: 10.1109/ICIIP.2015.7414772.

X. Wang, V. Ablavsky, H. B. Shitrit and P. Fua, "Take your eyes off the ball: Improving ball-tracking by focusing on team play", Computer Vision and Image Understanding, vol. 119, pp. 102-115, 2014.

J. Chen and P. Carr, Autonomous Camera Systems: A Survey, Workshops at the Twenty-Eighth AAAI Conference on Artificial Intelligence, pp. 18-22, 2014.

(56) References Cited

OTHER PUBLICATIONS

Elder JH, Prince SJD, Hou Y, Sizintsev M, Olevskiy E. Pre-attentive and attentive detection of humans in wide-field scenes International Journal of Computer Vision. 72:47-66. DOI: 10.1007/s11263-006-8892-7.

C. S. Pinhanez and A. F. Bobick, "Intelligent studios: Modeling space and action to control tv cameras", Applications of Artificial Intelligence, vol. 11, pp. 285-305, 1997.

Fabio Poiesi, fahad Daniyal, Andrea Cavallaro, De Iectorless Ball Localization Using Context and Motion Flow Analysis. Proceedings of 2010 IEEE 17th International Conference on Image Processing, Sep. 26-29, 2010, pp. 3913-3916.

D. Rozumnyi, J. Kotera, F. Sroubek, L. Novotny, J. Matas, "The World of Fast Moving Objects," in IEEE Conference on Computer Vision and Pattern Recognition (CVPR), 2017.

Probability summation and regional variation in contrast sensitivity across the visual field. JG Robson, N Graham. Vision research 21 (3), 409-418, 1981.

* cited by examiner

SYSTEM AND METHOD FOR AUTOMATED VIDEO PROCESSING OF AN INPUT VIDEO SIGNAL USING TRACKING OF A SINGLE MOVEABLE BILATERALLY-TARGETED GAME-OBJECT

TECHNICAL FIELD

The following relates generally to video processing technology; and more particularly, to systems and methods for automated video processing of an input video signal using tracking of a single moveable bilaterally-targeted game-object.

BACKGROUND

Video broadcasting of live sports is a popular way for people to watch sports contests, particularly at large elite levels of competition. Many such sports involve teams both targeting a single moveable game-object; for example, a puck in ice hockey, a soccer ball in soccer, a lacrosse ball in lacrosse, and the like. While such sports typically involve a large playing surface, instantaneous play is typically localized to a smaller region of the playing surface. Live spectators typically attentively shift their gaze to follow play. Professional sports videographers can pan and tilt their cameras to mimic this process. Manual videography can be economically prohibitive and inaccurate, especially for smaller market sub-elite levels of competition.

SUMMARY

In an aspect, there is provided a computer-implemented method for automated video processing of an input video signal using tracking of a single moveable bilaterally-targeted game-object, the input video signal capturing a team-based event involving the single moveable bilaterally-targeted game-object, the method comprising: receiving the input video signal comprising one or more contextual feature maps; coding the one or more contextual feature maps; determining estimated coordinates of the single moveable bilaterally-targeted game-object for each group of one or more frames of the input video signal using a trained machine learning model, the machine learning model receiving the coded one or more contextual feature maps as features to the machine learning model, the machine learning model trained using training data comprising a plurality of previously recorded training video signals each with associated coded one or more contextual feature maps, the training data further comprising ground truth data comprising screen coordinates of the single moveable bilaterally-targeted game-object; and outputting the estimated coordinates of the single moveable bilaterally-targeted game-object.

In a particular case of the method, the contextual feature maps comprise at least one of raw colour imagery, optic flow, and player detection and team classification.

In another case of the method, the player detection and team classification are encoded in three binary channels representing a first team, a second team, and referees.

In yet another case of the method, the method further comprising performing pre-processing, the pre-processing comprising at least one of normalizing the coded data, rescaling the one or more contextual feature maps, and padding the contextual feature maps.

In yet another case of the method, the method further comprising performing pre-processing, the pre-processing comprising assigning a first channel of a player mask to represent a first team and a second channel of the player mask represents a second team.

In yet another case of the method, the method further comprising performing unsupervised clustering to identify color models for determining team affiliation using Red, Green, Blue (RGB) space of the raw color imagery.

In yet another case of the method, the ground truth data comprises screen coordinates of the single moveable bilaterally-targeted game-object that were manually inputted by a user.

In yet another case of the method, the method further comprising performing temporal smoothing of the determination of the machine learning model comprising performing one of a recursive exponential causal smoother or a Gaussian non-causal smoother.

In yet another case of the method, the method further comprising performing dynamic cropping of the input video signal and outputting the dynamically cropped video signal, the dynamic cropping comprising determining a cropped video signal comprising the determined coordinates of the single moveable bilaterally-targeted game-object in each cropped frame of the cropped video signal.

In yet another case of the method, the method further comprising performing hardware tracking of the input video signal and outputting a tracked output video signal, the input video signal comprising a wide-field view and the tracked output video signal comprising a narrow-field view, the hardware tracking comprising dynamically moving the narrow-field view to include the determined estimated coordinates within the narrow-field view using one or more homographies.

In another aspect, there is provided a system for automated video processing of an input video signal using tracking of a single moveable bilaterally-targeted game-object, the input video signal capturing a team-based event involving the single moveable bilaterally-targeted game-object, the system comprising one or more processors and a memory, the one or more processors configured to execute: an input module to receive the input video signal comprising one or more contextual feature maps; a coding module to code the one or more contextual feature maps; a machine learning module to determine estimated coordinates of the single moveable bilaterally-targeted game-object for each group of one or more frames of the input video signal using a trained machine learning model, the machine learning model receiving the coded one or more contextual feature maps as features to the machine learning model, the machine learning model trained using training data comprising a plurality of previously recorded training video signals each with associated coded one or more contextual feature maps, the training data further comprising ground truth data comprising screen coordinates of the single moveable bilaterally-targeted game-object; and an output module to output the estimated coordinates of the single moveable bilaterally-targeted game-object.

In a particular case of the system, the contextual feature maps comprise at least one of raw colour imagery, optic flow, and player detection and team classification.

In another case of the system, the player detection and team classification are encoded in three binary channels representing a first team, a second team, and referees.

In yet another case of the system, the system further comprising a preprocessing module to perform pre-processing, the pre-processing comprising at least one of normalizing the coded data, rescaling the one or more contextual feature maps, and padding the contextual feature maps.

In yet another case of the system, the ground truth data comprises screen coordinates of the single moveable bilaterally-targeted game-object that were manually inputted by a user.

In yet another case of the system, the system further comprising a smoothing module to perform temporal smoothing of the determination of the machine learning model comprising performing one of a recursive exponential causal smoother or a Gaussian non-causal smoother.

In yet another case of the system, the system further comprising a videography module to perform dynamic cropping of the input video signal and output the dynamically cropped video signal, the dynamic cropping comprising determining a cropped video signal comprising the determined coordinates of the single moveable bilaterally-targeted game-object in each cropped frame of the cropped video signal.

In yet another case of the system, the system further comprising a videography module to perform hardware tracking of the input video signal and output a tracked output video signal, the input video signal comprising a wide-field view received from a pre-attentive camera and the tracked output video signal comprising a narrow-field view received from an attentive camera, the hardware tracking comprising dynamically moving a gaze of the attentive camera such that the narrow-field view includes the determined estimated coordinates of the game-object.

The system of claim 18, wherein dynamically moving the gaze of the attentive camera comprises determining homographies to back-project the estimated coordinates of the game-object in the wide-field view to a playing surface, and re-project the game object to the narrow-field view of the attentive camera to determine the gaze in which the narrow-field view comprises the determined estimated coordinates of the game-object.

In yet another case of the system, the system further comprising a smoothing module to smooth the tracked output video signal by minimizing acceleration of the movement of the attentive camera.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Figure 1:
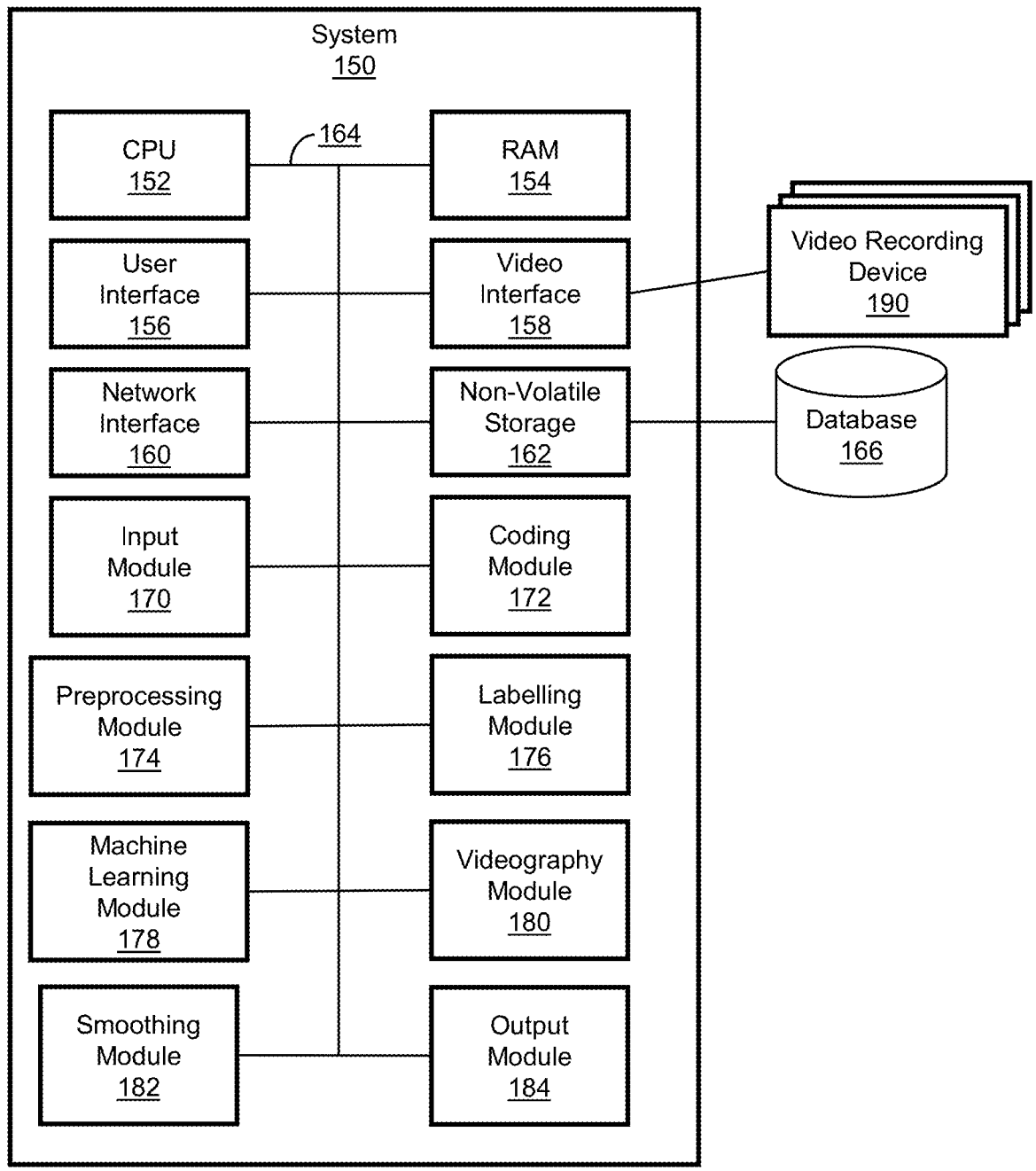
FIG. 1 illustrates a block diagram of a system for automated video processing of an input video signal using tracking of a single moveable bilaterally-targeted game-object, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

For a spectator who has a good seat at a sporting event, the playing surface may subtend around 90 degrees of their field of view. While this provides many options for what to view, a person's visual acuity falls off very rapidly with visual eccentricity. This means that to enjoy the game, the spectator will be constantly shifting their gaze to keep their eyes on the action. Most people who want to watch the sporting event remotely, do so on an electronic display. Generally, image quality received on such a display is below a live experience, and the angular subtense of the display will be much less than for the live spectator. For example, a standard 10-inch tablet computer, at a comfortable viewing distance of 60 cm, may subtend only around 24 degrees. Generally, to partially compensate for this mismatch between the live and remote experiences, professional videographers employ longer focal lengths so that the camera captures only a fraction of the playing surface at any one time, and constantly pan the camera to keep it on the play. Unfortunately, this approach is very expensive, especially for most amateur games or minor leagues, and can be inaccurate in keeping the game-object centered and the focus of the video feed.

The problem of game-object tracking is a difficult technical problem for computer vision. Tracking the game-object is even harder in team sports, where occlusion is common. In circumstances where the game object is small and moving quickly, such as in hockey or lacrosse, the small size and motion blur make it an even harder technical problem. Certain approaches address such tracking and detection using non-practical zoomed-in broadcast video, in which the game-object subtends between 150-250 pixels; 30-50 times the subtense of the game-object in wide-field video. Such approaches may also use background subtraction to detect the game-object and velocity estimates to associate detections across frames, but can generally only track the game-object for short intervals.

In the present embodiments, there is provided a system, method and computer program for automated video processing of an input video signal using tracking of a single moveable bilaterally-targeted game-object. In this sense, the system allows for automatic tracking of play; particularly for sports involving a single moveable bilaterally-targeted game-object. Such tracking advantageously allows a high-definition video feed to be dynamically cropped and retargeted to a viewer's display device. In various embodiments described herein, the game-object is employed as an objective surrogate for the location of play and used for ground-truthing game-object location from high-definition video. In using the game-object as a surrogate for the location of play, the game-object can serve as the basis for training a computer vision system. This can allow the system to train a deep network regressor that uses, for example, video imagery, optic flow, estimated player positions, and team affiliation to predict the location of play. Advantageously, exemplary implementations of the present embodiments have been shown to outperform other approaches, for example, a 'follow the herd' strategy. Thus, the present embodiments can result in a practical system for delivering high-quality curated video of live sports events to remote spectators. These embodiments can be especially advantageous for smaller market sports clubs and leagues whose production costs cannot afford many, or any, manual videographers.

The following embodiments generally provide technological solutions to the technical problems related to tracking and following play of a sports event automatically. In this way, the present embodiments provide technical solutions to long-standing challenges in the automatization of sports videography. Advantageously, in some embodiments, the video camera can be installed at a fixed location with a fixed orientation at the venue and the video stream can be processed automatically, by a computer vision approach described herein, to track the play. This can allow for a 'curated' video product consisting of a dynamic, zoomed-in view of the play to be automatically extracted from the raw video, and then outputted to viewers.

In some of the following embodiments, there is advantageously provided an approach for ground-truthing game-object location in wide-field video from a stationary camera and an approach for automatically tracking play in order to allow for dynamic cropping and reformatting.

In some of the present embodiments, an approach is provided that uses a synthesis of direct regression and scene understanding approaches. In this way, a regression framework is used based on regressing the single moveable bilaterally-targeted game-object as a ground-truthed scene variable; rather than merely regressing estimated camera parameters as in other approaches.

In some cases, tracking the actual game-object may not be feasible. For example, in a hockey game, direct cues for puck location may be weak. Hockey rinks, for example, are 61 m in length, while the puck is only 7.6 cm in diameter. This means that the puck will subtend at most 5 pixels in a 4K video. Additionally, the motion of the puck can reduce the effective contrast, so that the puck appears as a faint grey streak. In light of this, embodiments described herein can use one or more easier observed macroscopic visual cues that are statistically predictive of game-object location to track the game-object; for example, a pattern of optic flow, player positions, poses, and team affiliations.

Turning to FIG. 1, a system for automated video processing of an input video signal using tracking of a single moveable bilaterally-targeted game-object 150 is shown, according to an embodiment. In this embodiment, the system 150 is run on a local computing device (for example, a personal computer). In further embodiments, the system 150 can be run on any other computing device; for example, a server, a dedicated piece of hardware, a laptop computer, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 has a number of physical and logical components, including a central processing unit ("CPU") 152 (comprising one or more processors), random access memory ("RAM") 154, a user interface 156, a video interface 158, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse or a touchscreen. The user interface 156 can also output information to output devices, such as a display or speakers. In some cases, the user interface 156 can have the input device and the output device be the same device (for example, via a touchscreen). The video interface 158 can communicate with one or more video recording devices 190, for example high-definition video cameras, to capture a video of a sporting event. In further embodiments, the video interface 158 can retrieve already recorded videos from the local database 166 or a remote database via the network interface 160.

The network interface 160 permits communication with other systems, such as other computing devices and servers remotely located from the system 150, such as for a typical cloud-computing model. Non-volatile storage 162 stores the operating system and programs, including computer-executable instructions for implementing the operating system and modules, as well as any data used by these services. Additional stored data can be stored in a database 166. During operation of the system 150, the operating system, the modules, and the related data may be retrieved from the non-volatile storage 162 and placed in RAM 154 to facilitate execution.

In an embodiment, the system 150 further includes a number of modules to be executed on the one or more processors 152, including an input module 170, a coding module 172, a preprocessing module 174, a labelling module 176, a machine learning module 178, a videography module 180, a smoothing module 182, and an output module 184.

Figure 2:
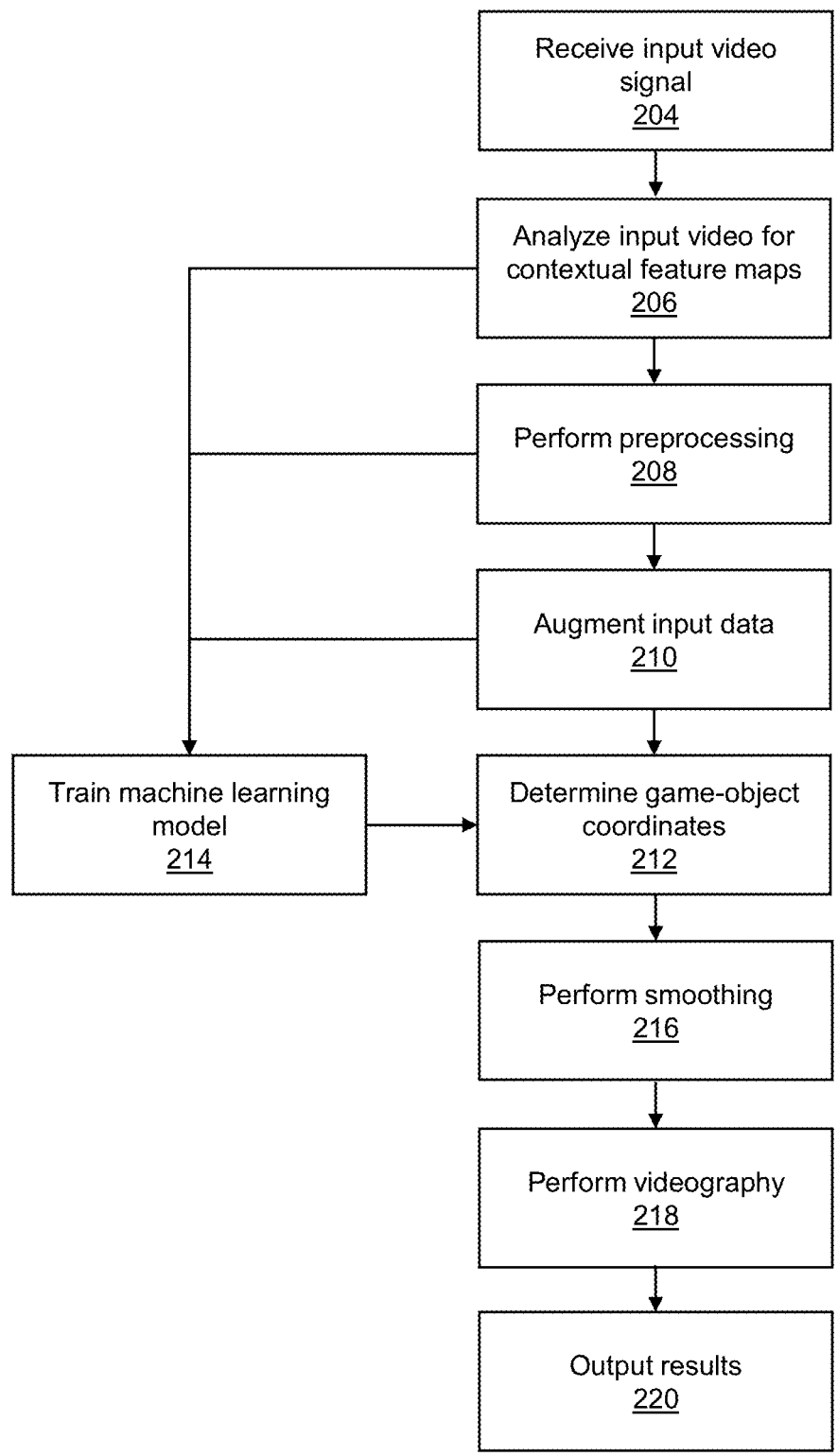
FIG. 2 illustrates a flow diagram of a method for automated video processing of an input video signal using tracking of a single moveable bilaterally-targeted game-object, according to an embodiment.

FIG. 2 illustrates a method 200 for automated video processing of an input video signal using tracking of a single moveable bilaterally-targeted game-object, in accordance with an embodiment. At block 204, the input module 170 receives an input video signal capturing a sporting event. The sporting event being a team-based event involving a single moveable bilaterally-targeted game-object; for example, a hockey game, a soccer game, a lacrosse game, or the like.

At block 206, the input video signal is analyzed by the coding module 172 for one or more contextual feature maps. As part of the analysis, each of the contextual feature maps are coded by the coding module 172 to a predetermined coding scheme. In an embodiment, the contextual feature maps can include one or more of (1) raw colour imagery, (2) optic flow, and (3) player detection and team classification. In an example, the raw colour imagery can be encoded in three channels: red, green, and blue (RGB). In this example, the optic flow can be coded in two channels representing x and y components of a flow field. In this example, the player detection and team classification can be encoded in three binary channels representing the two teams and referees, each player represented as a rectangle of 1s on a background of 0s. Thus, in this example, full input representation includes an 8-channel feature map. It is appreciated that in further examples, other suitable coding schemes can be used based on the particular contextual feature maps.

At block 208, in some embodiments, the preprocessing module 174 performs preprocessing on the input data comprising the coded contextual feature map data. In some cases, the preprocessing module 174 normalizes the coded data; for example, to between −1 and 1. In some cases, the preprocessing module 174 can rescale the coded contextual feature map data; for example, to 120×68 pixels. In some cases, the preprocessing module 174 can pad the scaled data to form a predetermined size input; for example, a 120×120, 240×240, or 360×360 pixel square 8-channel input.

At block 210, in some embodiments, the labelling module 176 can augment the input data. In a particular embodiment, the labelling module 176 can use an unsupervised clustering approach in RGB space to identify colour models for the three affiliations: Team 1, Team 2, and referee(s) (an example of which is illustrated in the input data of FIG. 15). In an example, k-means clustering can be used; for example, with K=3. In an example convention, Team 1 can refer to the team who is defending the left-side of the screen, and Team 2 can refer to the team who is defending the right-side of the screen. In an example, for hockey, each team's respective side can be established by identifying the goaltender of such team as the player who is consistently near that side of the screen.

In another embodiment, the labelling module 176 can augment the input data by left-right mirroring. Team labels can be automatically or manually assigned such that a first channel of a player mask represents a 'left team' and a second channel of the player mask represents a 'right team.'

At block 212, the machine learning module 178, using a trained machine learning model, determines estimated coordinates of the single moveable bilaterally-targeted game-object for each frame, or group of frames, of the input video signal using the input data. At block 214, training of the machine learning model comprises using training data comprising a plurality of previously recorded training video signals having at least some of the processing of block 206 to 210 applied. The training data further comprising ground truth data comprising screen coordinates of the single moveable bilaterally-targeted game-object. The screen coordinates are determined by having one or more observers observe the training video of the sporting event and, using an input device, manually track the screen location of the game-object. In some cases, the training data can be split into training sets and testing sets or training sets, testing sets, and cross-validation sets.

At block 216, in some cases, the smoothing module 182 can perform temporal smoothing on the frame-by-frame, or frame grouping-by-frame grouping, output of the machine learning model. Causal and/or non-causal temporal smoothers can be used to suppress high frequency temporal noise in the resulting tracking of the game-object. In an example, for causal smoothing, a recursive exponential causal smoother can be used, particularly one that implements an exponential IIR filter $$h(t) = \frac{1}{\lambda} e^{-t/\lambda},$$

varying the temporal smoothing constant $\lambda$. In an example, for non-causal smoothing, a Gaussian non-causal smoother $$h(t) = \frac{1}{\sqrt{2\pi}\,\sigma} e^{-\frac{t^2}{2\pi\sigma^2}}$$

can be used, particularly one that is truncated at $\pm 3\sigma$ and normalized to integrate to 1. The temporal smoothing constant $\sigma$ can be selected to minimize error on the validation data.

At block 218, the videography module 180 can perform videography on the input video signal having knowledge of the estimated coordinates of the single moveable bilaterally-targeted game-object for each frame, or group of frames, of the input video signal. In some cases, the videography module 180 can perform dynamic cropping. For example, where the input video signal captures the totality, or near totality of the playing surface, the videography module 180 can retarget the wide-field video to the size of a user's display device; such that a zoomed crop can be extracted. In some cases, the crop can be approximately centered to, or at least including in the cropped view, the estimated game-object location; while generally limiting the crop window to lie entirely within the field-of-view (FOV) of the wide-field video. The size and shape of the crop can be optimized individually for individual display devices. In some cases, in addition to, or instead of, cropping, and particularly where the FOV does not capture the whole playing surface, the videography module 180 can direct the video recording device 190 to automatically swivel or move to ensure the game-object is approximately centred in the FOV. In some cases, videography module 180 can direct the video recording device 190 to automatically zoom in or out to ensure that the game-object is within the FOV.

At block 220, the output module 184 outputs the coordinates of the game-object, the video having the videography performed on it in block 218, or both. The output module 184 outputs to at least one of the user interface 156, the database 166, the non-volatile storage 162, and the network interface 160.

Figure 3A:
FIG. 3A illustrates an exemplary image still from an input video signal capturing a first hockey rink.
Figure 3B:
FIG. 3B illustrates an exemplary image still from an input video signal capturing a second hockey rink.

Using an example of the present embodiments, the present inventors experimentally verified at least some of the advantages of the present embodiments. In a first example experiment, seven amateur hockey games at two different rinks (Rink 1 and Rink 2 respectively) were recorded using two different 4K 30 frame-per-second (fps) wide-FOV camera systems, illustrated in the exemplary frames of FIGS. 3A and 3B respectively. One game was recorded at Rink 1 in 3,840×2,160 pixel format, and six games were recorded at Rink 2 in 4,096×1,080 pixel format. For each game, for training of the machine learning model, segments of active play were extracted ranging from 10 to 77 seconds in duration. This resulted in a total of 918 seconds of active play at Rink 1 and 2,673 seconds at Rink 2.

In this exemplary experiment, the video signal data from Rink 1 was used to assess performance of the model when trained and tested on the same game. The dataset was partitioned into a training partition (the last 730 seconds of play) and a test partition (the first 188 seconds of play). The video signal from Rink 2 was used to assess generalization across different games. Game 4 was used to optimize parameters of the algorithms used to construct the feature maps. The first 100 frames of each game were used to ground truth player affiliations. Thus, a total of five different training/test splits were used to train and evaluate the machine learning model, ensuring that Game 4 was in the training partition. The test/train split is illustrated in the following table:

| Split | Game |  |  |  |  |  |
|---|---|---|---|---|---|---|
|  | 1 | 2 | 3 | 4 | 5 | 6 |
| 1 | Train | Train | Train | Train | Test | Test |
| 2 | Test | Test | Train | Train | Train | Train |
| 3 | Train | Test | Test | Train | Train | Test |
| 4 | Test | Train | Train | Train | Test | Test |
| 5 | Test | Test | Train | Train | Train | Test |

In this exemplary experiment, psychophysical approaches were used to ground truth coordinates of the game-object, in this case a hockey puck. Five observers viewed videos of the hockey games via a display device and used an input device to estimate the location of the puck; implicitly using both direct visual identification of the location of the puck and contextual cues to estimate puck location. In some cases, the frame rate can be slowed to allow for better training data quality at the expense of time required for ground truthing.

In this exemplary experiment, accuracy was assessed using within- and between-observer consistency, under the assumption that observers are approximately unbiased. While this accuracy quantification generally does not quantify lag, humans exhibit a lag of roughly 300-400 milliseconds when manually tracking unpredictable (Brownian) 2D target motion. Since the motion of the puck is predictable, average lag can be assumed to be much lower. In this experiment, results were tracked with reference to ice surface coordinates (in metres). Horizontal and vertical axis lengths of the elliptical image projection of the centre ice circle is measured, known to be 9 m in diameter, and used to identify a rough orthographic transformation from pixels in the image to meters on the ice that corrects for foreshortening along the vertical image axis, but not for perspective or nonlinear distortions. For this experiment, the approximate horizontal (X) and vertical (Y) dimensions of a pixel back-projected to ice coordinates are shown in the following table:

| Rink | X (cm) | Y (cm) |
|---|---|---|
| 1 | 1.2 | 3.7 |
| 2 | 1.1 | 3.4 |

Figure 4:
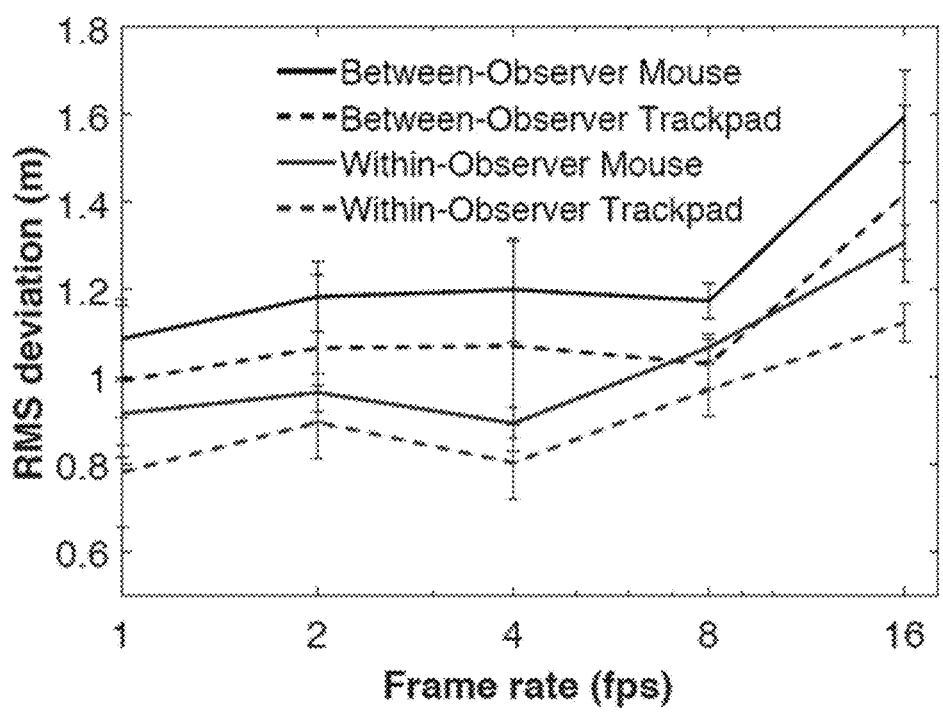
FIG. 4 illustrates a graph of root-mean-square (RMS) deviation within and between observers as a function of frame rate for an exemplary ground-truthing experiment, in accordance with the system of FIG. 1.

FIG. 4 illustrates a graph of root-mean-square (RMS) deviation within and between observers as a function of frame rate for this exemplary experiment. Deviations between observers were consistently about 20 cm (about 20%) higher than within observers, indicating some degree of individual differences in tracking behaviour. Deviations were found to rise with frame rate, but not dramatically at least until beyond 8 fps. Based on this exemplary experiment, the machine learning model was ground-truthed with the entire dataset at a framerate of 8 fps. RMS error of the ground truth was estimated to be on the order of 1 metre.

Figure 5A:
FIG. 5A illustrates an example validation image frame from the first hockey rink, in accordance with a first example of the system of FIG. 1.
Figure 5B:
FIG. 5B shows detected players for the frame of FIG. 5A.

In this exemplary experiment, player detection and team classification contextual feature maps were used. To train the player detector, bounding boxes for all players were labelled, including referees, by an observer for 100 random frames from the training partition of the Rink 1 data and from Game 4 of Rink 2, and these were divided randomly into 50 frames for training and 50 frames for validation. The training partitions were used to train an openCV implementation of the Histogram of Oriented Gradients (HOG) classifier for player detection in the luminance domain. Positive samples were augmented by left-right mirroring. For each positive sample, ten negative samples were generated from random locations of the same frame that did not overlap the positive samples. The width and height of the negative bounding boxes were drawn randomly and uniformly from the range of widths and heights of positive examples. A standard two-pass training process was used: an initial linear support-vector-machine (SVM) was trained on the training set then used to detect players in the training images. False positives from the training set were then added to the set of negative examples and the SVM was retrained. The performance of the detector on the validation set for full, half and quarter resolution images was measured, and it was found that halving the resolution (1920×1080 pixels for Rink 1 and 1920×540 pixels Rink 2) generated optimal F-scores. FIG. 5A shows an example validation image from Rink 1 and FIG. 5B shows detected players for that frame.

Figure 6:
FIG. 6 illustrates a 3-channel binary map representing player position and affiliation, in accordance with the first example.

In this exemplary experiment, each detected player was classified as belonging to one of the two teams or as a referee. In this experiment, the player/referee affiliations were manually-labelled by an observer for all detected players. These affiliations allow the system to train a 3-way deep affiliation classifier for each game. In this experiment, a version of a CIFAR-10 network of Krizhevsky & Hinton was used, modified for 3 classes. Player position and affiliation were then represented as a 3-channel binary map as shown in FIG. 6.

Figure 7:
FIG. 7 illustrates optic flow as a two-channel map containing x and y components of the flow field, in accordance with the first example.

In this exemplary experiment, an optic flow contextual feature map was used employing an OpenCV implementation of Farneback's dense optical flow algorithm. Optic flow is represented in FIG. 7 as a two-channel map containing x and y components of the flow field. To evaluate the influence of image resolution on the optic flow contribution, the machine learning model was trained and tested at full, half, quarter and one-eighth resolutions, using the training partition of the Rink 1 data and Game 4 for Rink 2. In this experiment, it was determined that quartering image resolution (960×540 pixels for Rink 1 and 960×270 pixels for Rink 2) minimized error. This resolution was used to compute the optic flow maps for the remainder of the datasets.

In this exemplary experiment, the contextual feature maps were normalized to between negative 1 and 1, and rescaled to 120×68 pixels, then stacked and padded to form a 120×120 square 8-channel input. The training dataset was augmented by left-right mirroring. Team labels were assigned such that the first channel of the player mask represented the left team and the second channel represented the right team. A machine learning model was developed using a PyTorch neural network, which was loosely based on AlexNet. The neural network consisted of three cony-cony-pool modules. The parameters of the two convolution layers of the first module were: 32-11-2 and 64-7-1, read as channels-kernel-stride. The parameters of two convolution layers in the second module were 128-5 and 256-5 and those in the third module were 512-3 and 1024-3. In both the modules, convolutional stride was set to 0. Every convolutional layer had padding of 1. The first max pooling layer had a filter size of 3×3 with stride length 2. The subsequent pooling layers had filter size of 2×2 with stride length of 2. The three fully connected layers consisted of 8,192, 1,024 and 512 units, decreasing as the length of the network increased. Dropout was used between every fully connected layer. The output of the network was the estimated x-y pixel coordinates of the puck. The loss function was determined as a Euclidean distance between estimated and ground-truth puck location, minimized using an Adam optimizer. The model was trained for 50 epochs, with a learning rate initialized to $5\times10^{-5}$ and decaying by 10% every 10 epochs. While the above example architecture was used, it should be appreciated that any suitable architecture may be used.

Figure 8A:
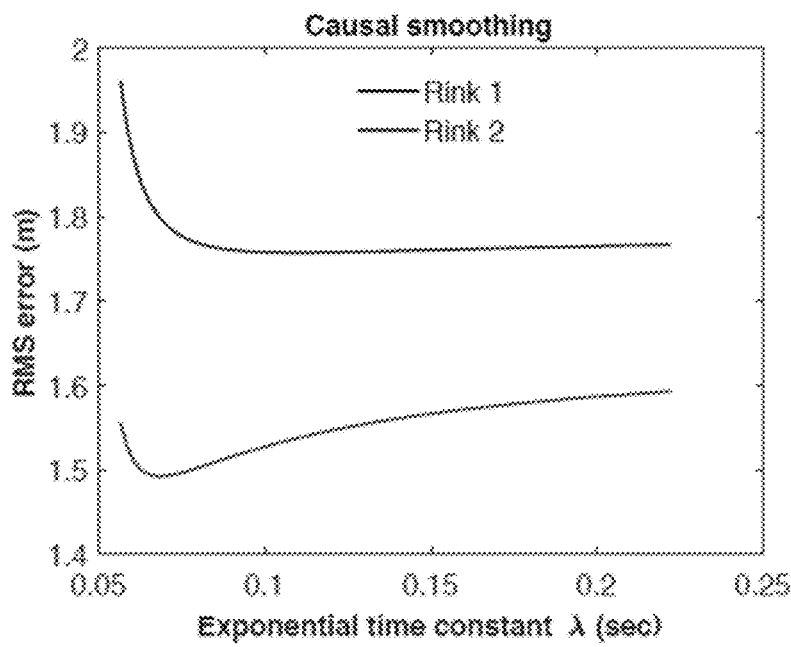
FIG. 8A illustrates RMS error on training data for the model with causal temporal smoothing, in accordance with the first example.
Figure 8B:
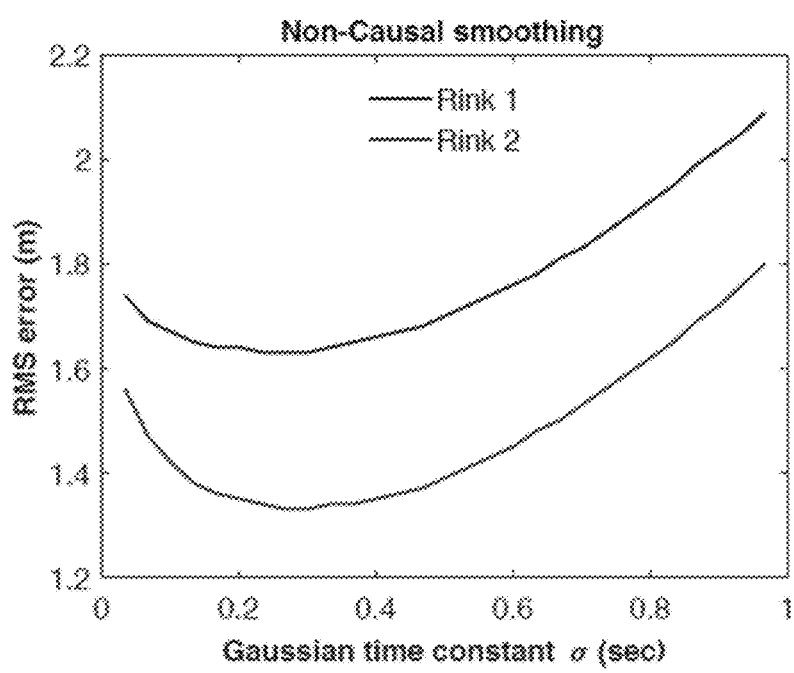
FIG. 8B illustrates RMS error on training data for the model with non-causal temporal smoothing, in accordance the first example.

In this exemplary experiment, temporal smoothing was applied. While there is generally a high correlation in the ground-truth puck location over successive frames, the machine learning model in the embodiment of this experiment estimates the puck location in each frame independently. Both causal and non-causal temporal smoothers were evaluated to suppress high frequency temporal noise in the resulting tracking of the puck. For causal smoothing, a recursive exponential causal smoother was evaluated implementing the exponential IIR filter $h(t)=1/\lambda e^{-t/\lambda}$, varying the temporal smoothing constant λ. For non-causal smoothing, a Gaussian non-causal smoother $$h(t) = \frac{1}{\sqrt{2\pi}\,\sigma} e^{-\frac{t^2}{2\pi\sigma^2}}$$

was evaluated; truncated at ±3σ and normalized to integrate to 1, varying the temporal smoothing constant σ. FIG. 8A shows RMS error on training data for the model with causal temporal smoothing and FIG. 8B shows RMS error on training data for the model with non-causal temporal smoothing. Both show an improvement in tracking error on the training data; however, both the time constant and reduction in error for causal smoothing are smaller. This may be due to lag introduced by the exponential filter, which may cancel the benefit of noise reduction. In the exemplary experiment, non-causal smoothing with optimal time constants was used for evaluation. Optimal time constants $\lambda_{opt}$ and $\sigma_{opt}$ for causal and non-causal smoothing were determined in accordance with the following table:

| Rink | $\lambda_{opt}$ (sec) | $\sigma_{opt}$ (sec) |
|---|---|---|
| 1 | 0.067 | 0.27 |
| 2 | 0.048 | 0.30 |

For evaluation of this exemplary experiment, the system was benchmarked against a baseline median player position tracker (MPP), which uses the median player position from the player detection map as an estimate of puck location. To understand the relative contribution of the colour imagery, player positions, affiliations and optic flow to the system (abbreviated "APT" herein), the system was also trained and evaluated using the input subsets in the table below. The table below shows the results of evaluation on the Rink 1 test set. The results reveal that the colour imagery, player positions and optic flow are all useful features and the system achieves best performance by using all three. The benefit of smoothing is also confirmed, and a total reduction in error of 44% relative to our baseline MPP model that uses the median player position is achieved.

| Model | Features | RMS error (m) |
| --- | --- | --- |
| MPP | Median player position | 8.6 |
| C | RGB | 6.7 |
| P | Player positions & affiliations | 7.0 |
| O | Optic flow field | 6.5 |
| CP | RGB + Player positions & affiliations | 6.3 |
| CO | RGB + optic flow field | 5.6 |
| PO | Player positions & affiliations + optic flow field | 5.7 |
| APT | All features (CPO) | 5.2 |
| APT + S | APT + Smoothing | 4.9 |

Figure 9:
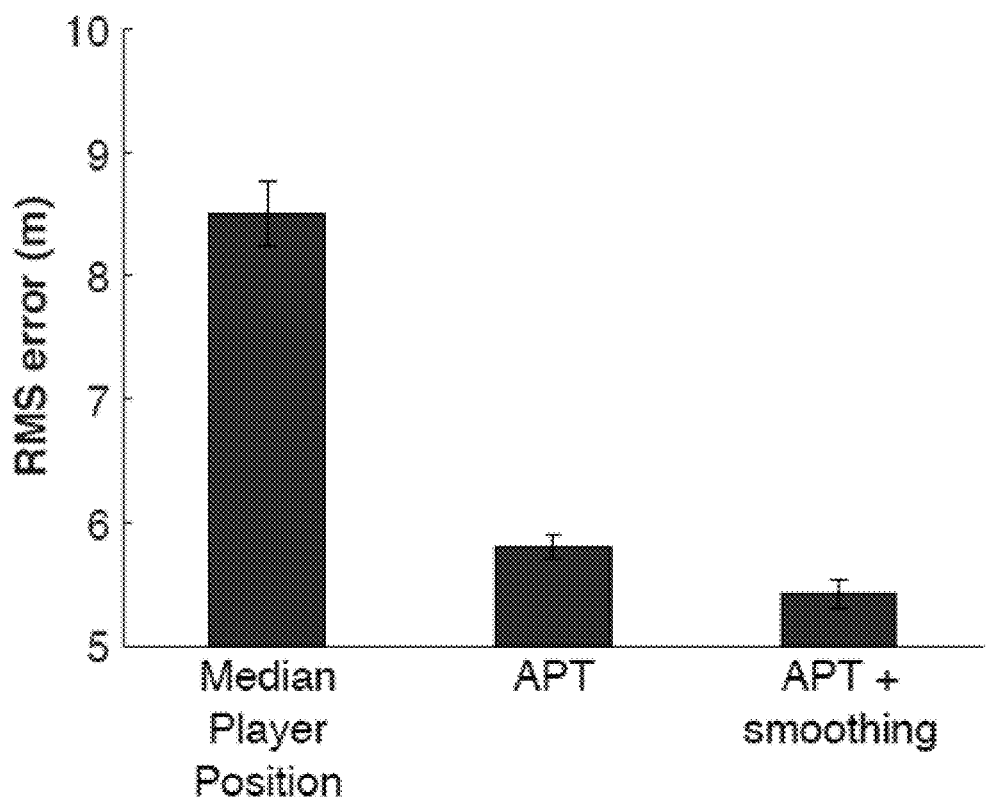
FIG. 9 is a bar graph illustrating results of evaluation over the second hockey rink test splits, in accordance with the first example.

FIG. 9 is a bar graph illustrating the results of evaluation over the Rink 2 test splits. In this case, the system achieves a reduction in error of 37% relative to the baseline MPP model. Thus, the ability to generalize over games is demonstrated.

Figure 10:
FIG. 10 illustrates sample results for test images from the first hockey rink, in accordance with the first example.
Figure 11:
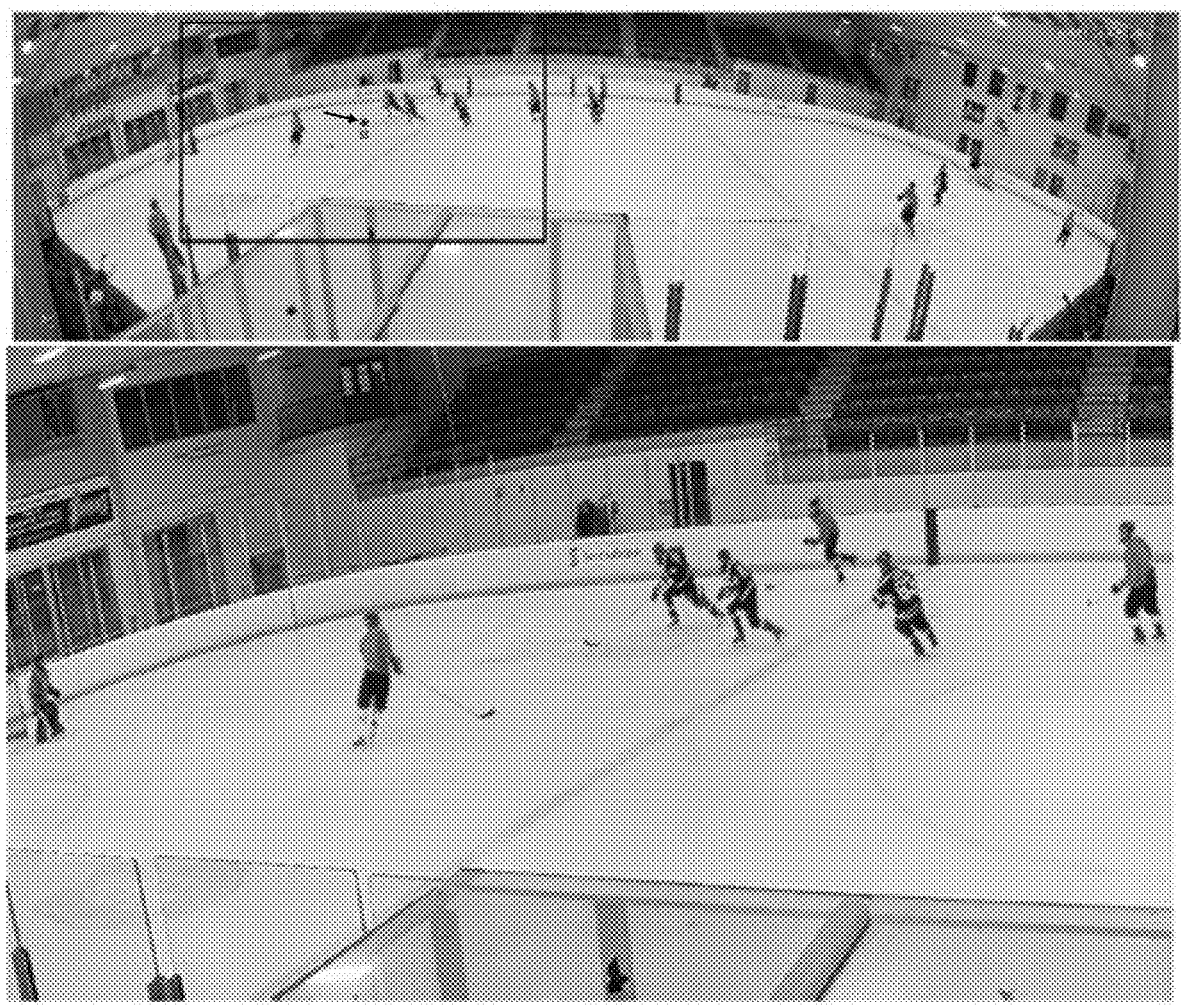
FIG. 11 illustrates sample results for test images from the second hockey rink, in accordance with the first example.
Figure 12:
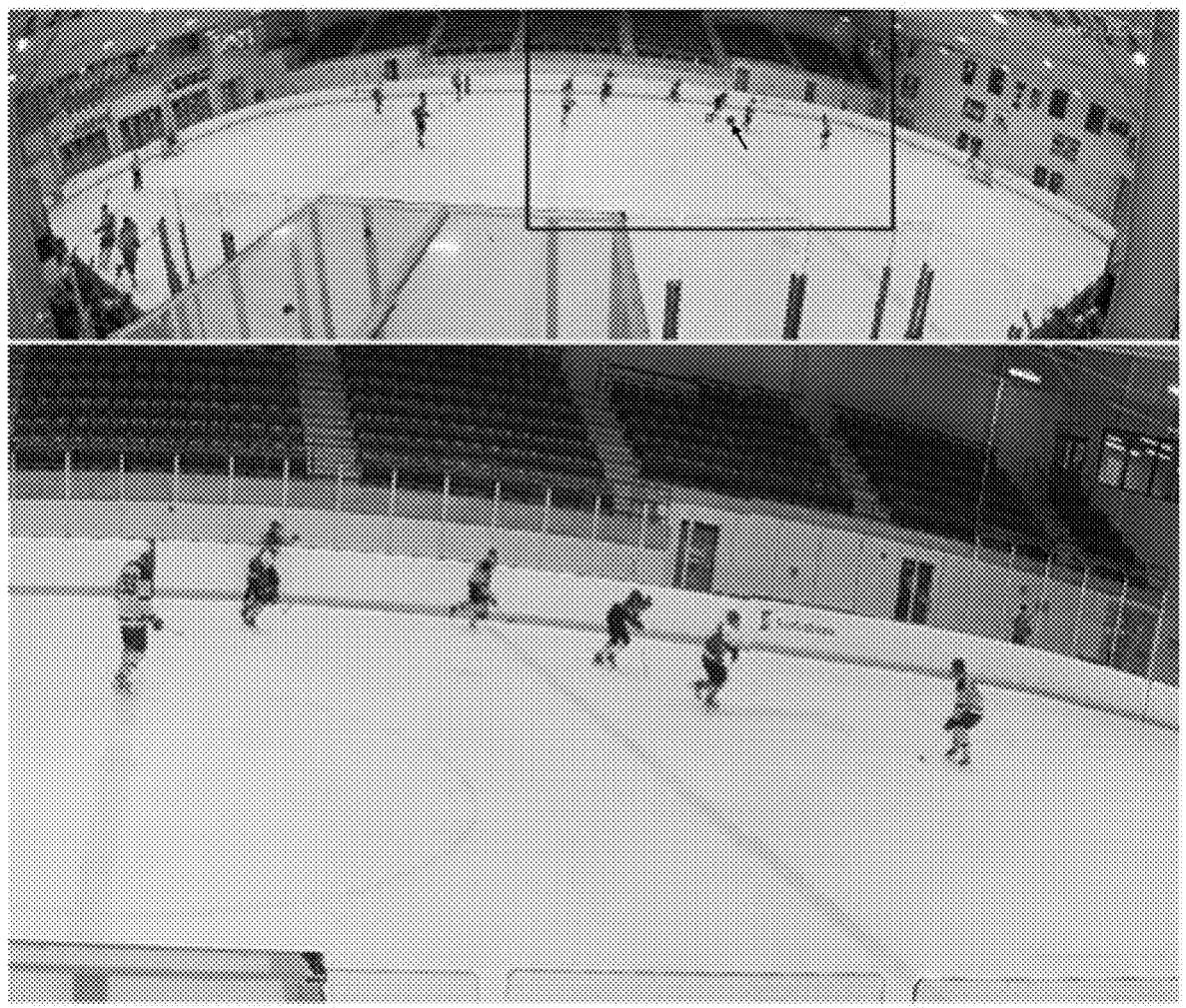
FIG. 12 illustrates more sample results for test images from the second hockey rink, in accordance with the first example.

Thus, the accuracy demonstrated in the exemplary experiment above is sufficient for automatic dynamic cropping of a wide-field video stream. In further exemplary experiments, the present inventors determined video examples for a 1280×720 pixel crop, representing roughly one third of the width of the original wide-field video. In that experiment, the puck remained within the cropped FOV at least 88% of the time with the test datasets. Advantageously, the non-causal smoothing was observed to not only improve accuracy but also eliminate annoying jitter, resulting in a more enjoyable user experience. FIGS. 10 to 12 show exemplary results for sample frames in accordance with the present embodiments. FIG. 10 shows sample results for test images from Rink 1 and FIGS. 11 and 12 show sample results for test images from Rink 2. The dots pointed to by the arrow on the images indicate ground truth puck location and the 'X' represents the location estimated by the system with temporal smoothing. The rectangles indicate the 1280×720 crop region.

In a second example experiment, which was comparable to the first experiment, the present inventors were able to establish that the present embodiments transfer across rinks; for example, training on a particular rink and testing on different rink. Similar to the first experiment, the system regressed a scene variable (a puck in a hockey game) such that a deep network regressor could predict puck location, and thus be used to dynamically zoom wide angle video.

Figure 13A:
FIG. 13A illustrates an example validation image frame from a first camera system, in accordance with a second example of the system of FIG. 1.
Figure 13B:
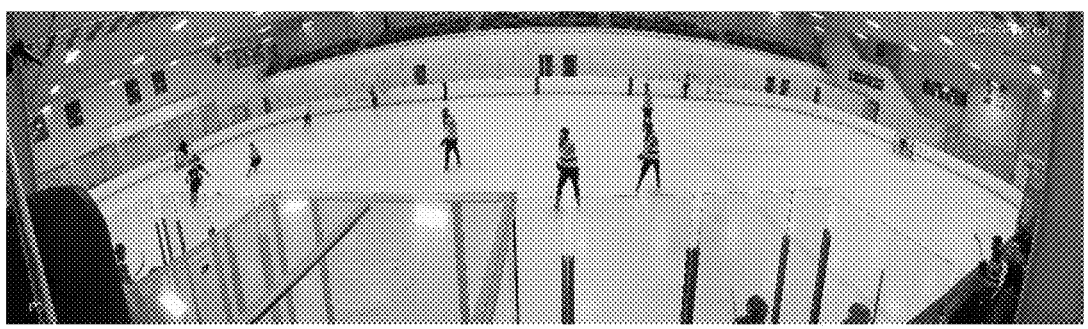
FIG. 13B illustrates an example validation image frame from a second camera system, in accordance with the second example.
Figure 14:
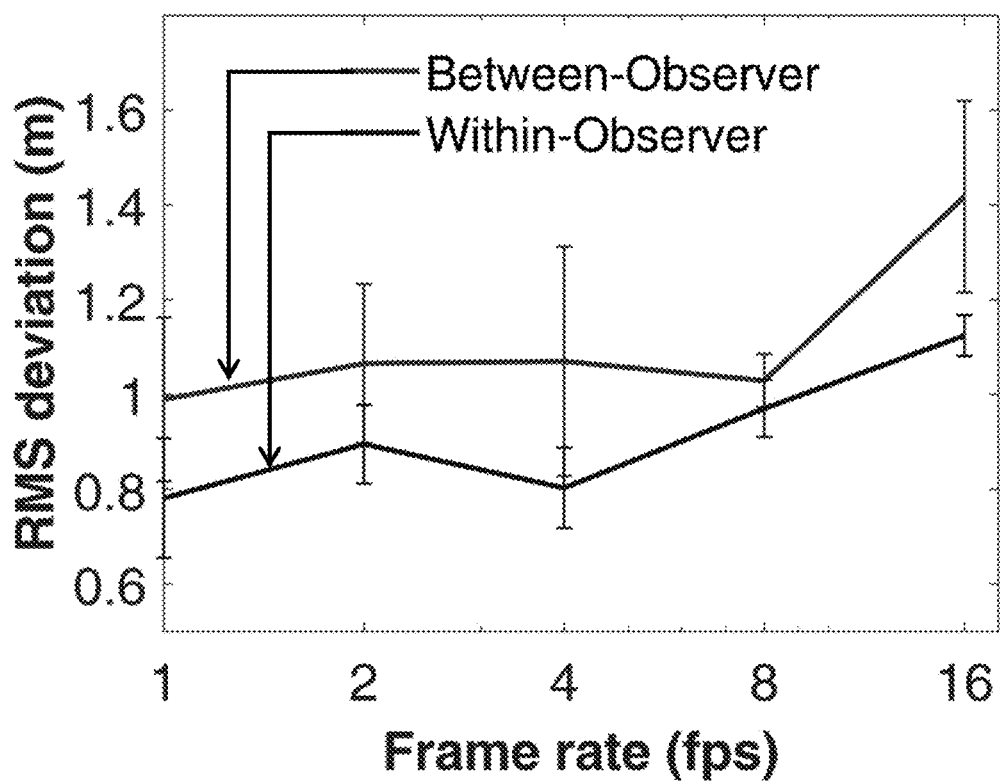
FIG. 14 illustrates a graph of root-mean-square (RMS) deviation within and between observers as a function of frame rate for the second example.

In the second example experiment, seven amateur hockey games at four different rinks (Rinks 1, 2, 3 and 4, respectively) were recorded using two different 4K 30 frame-per-second (fps) wide-FOV camera systems, illustrated in the exemplary frames of FIGS. 13A and 13B respectively. The first camera system recorded in 3,840×2,160 pixel format, and the second camera system recorded in 4,096×832 pixel format. In the second experiment, ground-truthing was conducted by having observers view the wide-FOV video and track the puck using an input device. As illustrated in FIG. 14, error was assessed by analyzing within-observer and between-observer consistency. In this example, consistency was determined to begin to decrease at around 16 fps, with 8 fps determined to optimize accuracy and efficiency.

Figure 15:
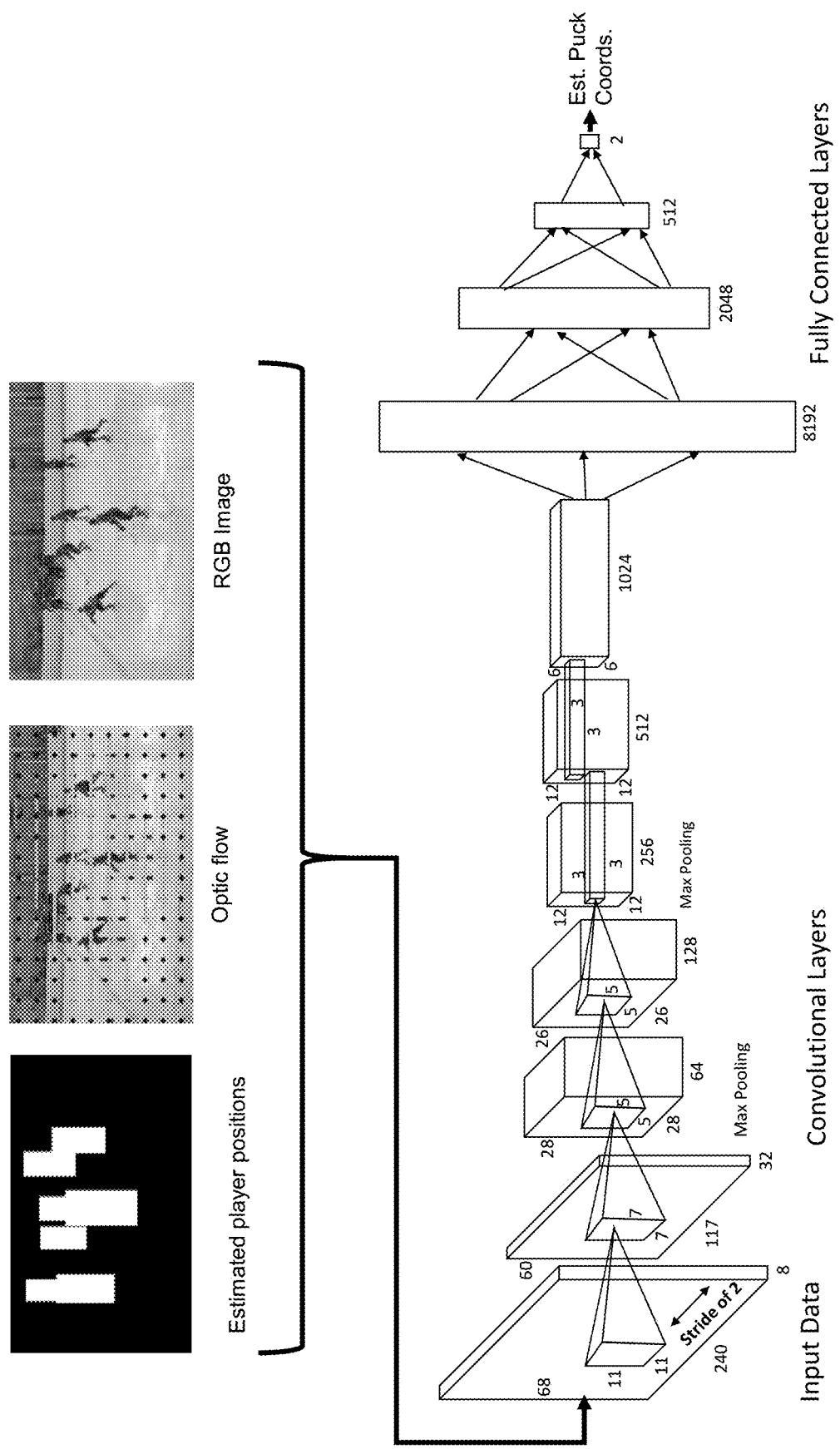
FIG. 15 illustrates a diagram of the deep neural network for determining estimated puck coordinates for the second example.

In the second example experiment, as shown in FIG. 15, a deep neural network (DNN) regressor was used to estimate the puck coordinates on a frame-by-frame basis. The DNN used an RGB frame image, an optic flow image (as described herein), and estimated player positions (as described herein) as input data. The input data was fed into convolutional layers, which the, fed into fully connected layers that produced the output. In this example, the diagram illustrates the size of each layer; for example, for the first input layer, "68" is the height of the feature maps (in pixels), "240" is the width of the feature maps (in pixels), "8" is the number of channels in the feature maps (3 RGB, 2 optic flow, 3 affiliations), and "11"×"11" is the size of the convolutional filter. This example labelling scheme is analogous for the remaining convolutional layers. In this example, for the fully connected layers, the numbers represent the number of units.

Figure 16:
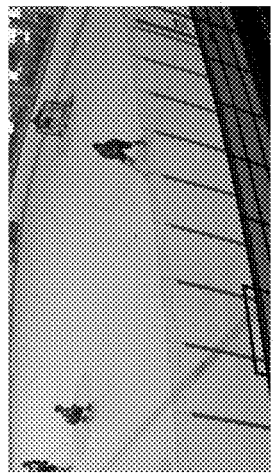
FIG. 16 illustrates a dynamically cropped view, in accordance with the second example.
Figure 16:
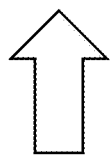
Figure 16:
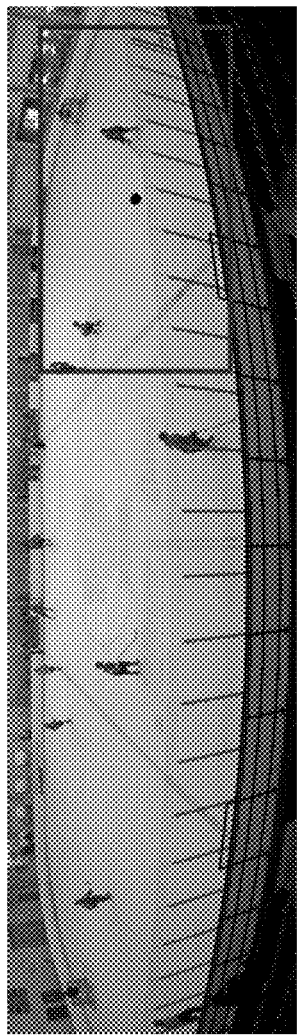
Figure 17:
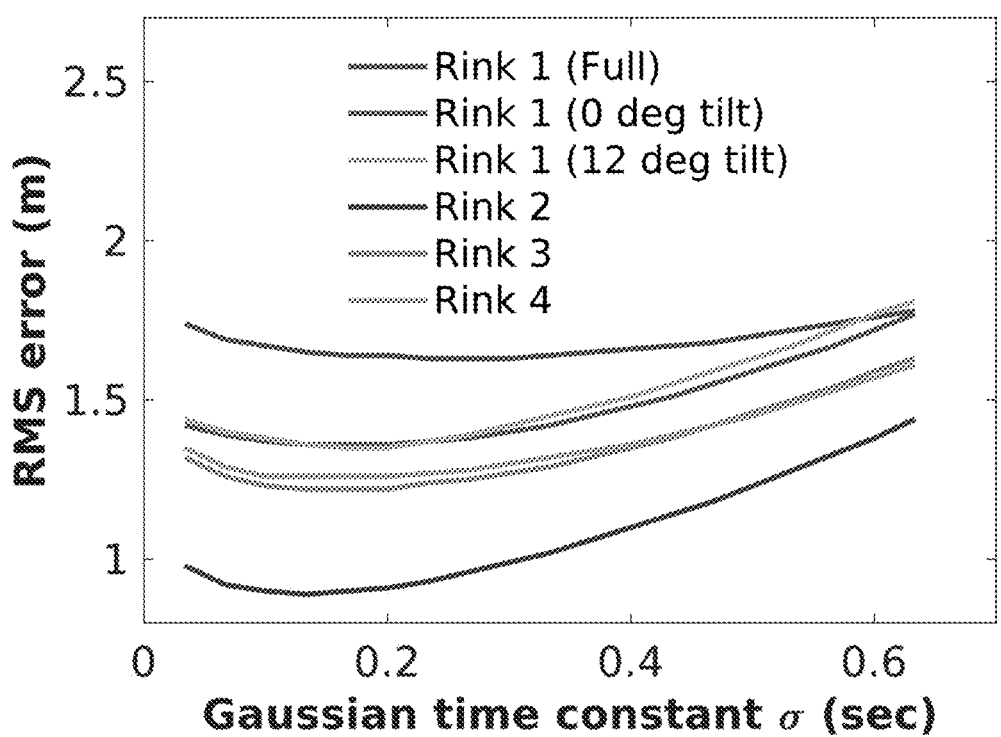
FIG. 17 illustrates RMS error on input data, in accordance with the second example.

In the second example experiment, as shown in FIG. 16, the system can dynamically zoom in on a portion of the wide-FOV image that includes the location of the puck. In the second example experiment, as shown in FIG. 17, non-causal Gaussian temporal smoothing can be used to improve accuracy and reduce jitter. In this example, a time constant of $\sigma=150$-270 msec was found to be optimal.

In the second example experiment, when the contribution of each input feature was evaluated, it was determined that there was a 38% improvement over baseline median player position (MPP). Advantageously, there was still a 28% improvement over baseline when transferred across rinks (applied to rinks that were not used for the training data); for example, for Rinks 2 to 4:

| | | RMS Error (m) | |
| --- | --- | --- | --- |
| Training Rinks | Test Rinks | Current embodiments with smoothing | MPP |
| 2, 3 | 4 | 5.7 | 7.7 |
| 2, 4 | 3 | 6.1 | 8.5 |
| 3, 4 | 2 | 5.9 | 8.4 |

Figure 18:
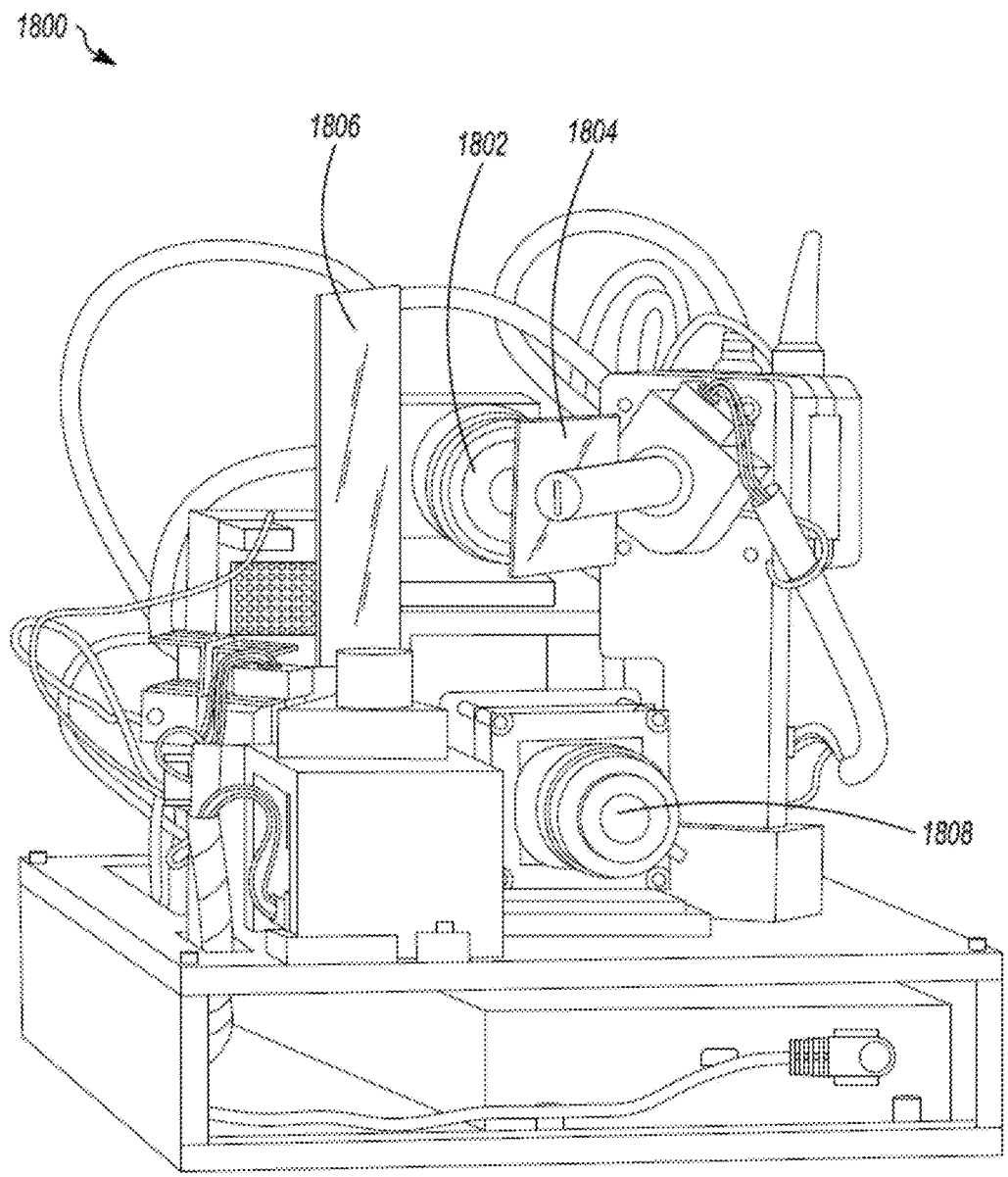
FIG. 18 illustrates an example of a hardware tracking apparatus in accordance with the system of FIG. 1.

The above embodiments of the system 150 generally describe software tracking by the videography module 180 at block 218 (for example, by dynamic cropping). In further embodiments, the videography module 180 at block 218 can perform hardware tracking. While requiring more hardware, hardware tracking advantageously may not require reducing video resolution through cropping and may have less motion blur induced by the movement of the players and the game object. FIG. 18 illustrates an example of a hardware tracking apparatus 1800 comprising multiple video recording devices 190, referred to as a narrow-field attentive camera 1802 and a wide-field pre-attentive camera 1808. In this example, the hardware tracking apparatus 1800 also comprises a tilt mirror 1804 and a pan mirror 1806 to direct the gaze of the attentive camera 1802.

In the hardware tracking example, the wide-field pre-attentive camera 1808 is used to record the entire playing surface and this video feed is used to estimate the location of the game object; as described above. However, in hardware tracking, the second, narrow-field attentive camera 1802 is also deployed, generally in close proximity to the pre-attentive camera 1808. This attentive camera 1802 can be CPU 152 controlled; for example, mounted on a motorized and CPU 152 controlled pan unit that allows the horizontal gaze angle of the attentive camera to be varied dynamically. Alternatively, as illustrated in FIG. 18, a mirror 1806 can be mounted on a pan motor to deflect the gaze. In some cases, a tilt unit can also be included to deflect the gaze vertically; such as with a motorized and CPU 152 controlled mount or with a CPU 152 controlled tilt mirror 1804.

For each frame of the pre-attentive video, a pair of homographies can be used to back-project the game object to the playing surface and then re-project it to the attentive camera image. For example, consider a 3D world frame centred at the centre of the playing surface, with X-axis pointing along the playing surface toward the right-side goal, Y-axis pointing along the playing surface toward the opposite side of the playing surface, and Z-axis pointing up. This common world frame can be used to define two homographies (mappings between planes): one fixed homography $H_{ps}$ that maps from points $(x_{ps}, y_p)$ in the pre-attentive camera sensor plane to points $(x_s, y_s)$ on the playing surface; and a second, variable homography $H_{ps}(\theta, \phi)$ that maps from points $(x_s, y_s)$ on the playing surface to points $(x_a, y_a)$ in the attentive camera sensor plane. Note that this second homography is generally a function of the instantaneous pan and tilt angles $\theta$ and $\phi$. These homographies can be determined through a calibration procedure. Due to the transitivity property enjoyed by homographies, this two-step process can be condensed to a single homography $H_{pa}(\theta, \phi) = H_{sa}(\theta, \phi) H_{ps}$ that maps directly from pre-attentive to attentive coordinates.

This re-projection of points in the pre-attentive sensor plane to points in the attentive sensor plane can be used as a gaze target to dynamically control the pan motor or mirror, with the goal of keeping the game object centred in the frame of the attentive camera 1802. Note that in most cases, updated estimates of the game object location can be obtained at frame rate (e.g., 30 fps). In some cases, a smoothing control approach can be used that attempts to zero the slip (error in tracking) during the intervals between frames (e.g., 33 msec) while minimizing acceleration of the motors and thus achieving the smoothest viewing experience possible. The result of the hardware tracking is, advantageously, a curated video product at full (e.g., 4K) resolution in which the dominant source of motion blur due to translation of the play has been nulled, resulting in an improved viewing experience.

In an example, the smoothing control approach can be performed by the smoothing module 182 and include letting $(x_o, v_o)$ and $(x_s, v_s)$ represent the initial position (at time t=0) and velocity of the target object and sensor, respectively. Let T represent the inter-frame interval. The sensor accelerates at a rate a from time t=0 to time $t=t_0 \le T$ and at a rate $-a$ from time $t=t_0$ to $t=T$. The acceleration of the sensor is thus given by:

$$x''(t) = a,$$
$$0 < t < t_0 = -a,$$
$$t_0 \le t < T.$$

Integrating once obtains:

$$x'(t) = v_s + at,$$
$$0 < t < t_0 = v_s + at_0 - a(t - t_0) = v_s + 2at_0 - at,$$
$$t_0 \le t < T.$$

Integrating again obtains:

$$x(t) = x_s + v_s t + \frac{1}{2} a t^2,$$
$$0 < t < t_0 = x(t_0) + \int_{t_0}^{t} x'(t) dt = x_s - a t_0^2 + (v_s + 2a t_0)t - \frac{1}{2} a t^2,$$
$$t_0 \le t < T$$

Seeking to match the target velocity and position at time t=T:

$$x'(T) = v_s + 2a t_0 - aT = v_o$$

$$x(T) = x_s - a t_0^2 + (v_s + 2a t_0)T - \frac{1}{2} a T^2 = x_o + v_o T$$

If $v_o = v_s$, $x'(T)$ yields $t_0 = T/2$. Substituting into the equation for $x(T)$ then yields:

$$a = \frac{4}{T^2}(x_o - x_s)$$

If $v_o \ne v_s$, the equation for $x'(T)$ can be solved for a, obtaining:

$$a = \frac{v_o - v_s}{2t_0 - T}$$

Substituting into the equation for $x(T)$ and collecting terms in $t_0$, obtains:

$$(v_o - v_s)t_0^2 - 2(x_o - x_s + 2T(v_o - v_s))t_0 - (x_o - x_s)T - \frac{1}{2}(v_o - v_s)T^2 = 0$$

Dividing by $v_o - v_s$ and letting $t_1 = (x_o - x_s)/(v_o - v_s)$, the above can be rewritten as:

$$t_0^2 - 2(t_1 + 2T)t_0 - t_1 T - \frac{1}{2} T^2 = 0.$$

Solving for $t_0$ obtains:

$$t_0 = -t_1 \pm \sqrt{\Delta}, \text{ where } \Delta = t_1^2 + t_1 T + T^2/2$$

Since $t_0 \in [0, T]$, assign $t_0 = -t_1 + \sqrt{\Delta}$ if $\sqrt{\Delta} < t_1 + T$ and $t_0 = -t_1 - \sqrt{\Delta}$ otherwise.

Although the examples described herein describe use of certain machine learning models and tools, it is appreciated that any suitable machine learning model can be used.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-implemented method for automated video processing of an input video signal using tracking of a single moveable bilaterally-targeted game-object, the input video signal capturing a team-based event involving the single moveable bilaterally-targeted game-object, the method comprising:
    receiving the input video signal;
    determining and coding one or more contextual feature maps from the input video signal;

determining estimated coordinates of the single moveable bilaterally-targeted game-object for a group of one or more frames of the input video signal using a trained machine learning model, the trained machine learning model receiving the coded one or more contextual feature maps as features to the trained machine learning model, the trained machine learning model trained by using training data comprising a plurality of previously recorded training video signals each with associated coded one or more contextual feature maps, the training data further comprising ground truth data comprising screen coordinates of the single moveable bilaterally-targeted game-object; and outputting the estimated coordinates of the single moveable bilaterally-targeted game-object for the group of one or more frames of the input video signal.

2. The method of claim 1, wherein the coded contextual feature maps from the input video signal and the coded contextual feature maps of the previously recorded training video comprise at least one raw colour imagery, optic flow, and player detection and team classification.

3. The method of claim 2, wherein the player detection and team classification are encoded in three binary channels representing a first team, a second team, and referees.

4. The method of claim 1, further comprising performing pre-processing, the pre-processing comprising at least one of normalizing the coded data, rescaling the one or more contextual feature maps, and padding the contextual feature maps.

5. The method of claim 1, further comprising performing pre-processing, the pre-processing comprising assigning a first channel of a player mask to represent a first team and a second channel of the player mask represents a second team.

6. The method of claim 2, further comprising performing unsupervised clustering to identify color models for determining team affiliation using Red, Green, Blue (RGB) space of the raw color imagery.

7. The method of claim 1, wherein the ground truth data comprises screen coordinates of the single moveable bilaterally-targeted game-object that were manually inputted by a user.

8. The method of claim 1, further comprising performing temporal smoothing of the determination of the machine learning model comprising performing one of a recursive exponential causal smoother or a Gaussian non-causal smoother.

9. The method of claim 1, further comprising performing dynamic cropping of the input video signal and outputting the dynamically cropped video signal, the dynamic cropping comprising determining a cropped video signal comprising the determined coordinates of the single moveable bilaterally-targeted game-object in each cropped frame of the cropped video signal.

10. The method of claim 1, further comprising performing hardware tracking of the input video signal and outputting a tracked output video signal, the input video signal comprising a wide-field view and the tracked output video signal comprising a narrow-field view, the hardware tracking comprising dynamically moving the narrow-field view to include the determined estimated coordinates within the narrow-field view using one or more homographies.

11. A system for automated video processing of an input video signal using tracking of a single moveable bilaterally-targeted game-object, the input video signal capturing a team-based event involving the single moveable bilaterally-targeted game-object, the system comprising one or more processors and a memory, the one or more processors configured to execute:

an input module to receive the input video signal;

a coding module to determine and code one or more contextual feature maps from the input video signal;

a machine learning module to determine estimated coordinates of the single moveable bilaterally-targeted game-object for a group of one or more frames of the input video signal using a trained machine learning model, the trained machine learning model receiving the coded one or more contextual feature maps as features to the trained machine learning model, the trained machine learning model trained by using training data comprising a plurality of previously recorded training video signals each with associated coded one or more contextual feature maps, the training data further comprising ground truth data comprising screen coordinates of the single moveable bilaterally-targeted game-object; and an output module to output the estimated coordinates of the single moveable bilaterally-targeted game-object for the group of one or more frames of the input video signal.

12. The system of claim 11, wherein the coded contextual feature maps from the input video signal and the coded contextual feature maps of the previously recorded training video comprise at least one raw colour imagery, optic flow, and player detection and team classification.

13. The system of claim 12, wherein the player detection and team classification are encoded in three binary channels representing a first team, a second team, and referees.

14. The system of claim 11, further comprising a preprocessing module to perform pre-processing, the pre-processing comprising at least one of normalizing the coded data, rescaling the one or more contextual feature maps, and padding the contextual feature maps.

15. The system of claim 11, wherein the ground truth data comprises screen coordinates of the single moveable bilaterally-targeted game-object that were manually inputted by a user.

16. The system of claim 11, further comprising a smoothing module to perform temporal smoothing of the determination of the machine learning model comprising performing one of a recursive exponential causal smoother or a Gaussian non-causal smoother.

17. The system of claim 11, further comprising a videography module to perform dynamic cropping of the input video signal and output the dynamically cropped video signal, the dynamic cropping comprising determining a cropped video signal comprising the determined coordinates of the single moveable bilaterally-targeted game-object in each cropped frame of the cropped video signal.

18. The system of claim 11, further comprising a videography module to perform hardware tracking of the input video signal and output a tracked output video signal, the input video signal comprising a wide-field view received from a pre-attentive camera and the tracked output video signal comprising a narrow-field view received from an attentive camera, the hardware tracking comprising dynamically moving a gaze of the attentive camera such that the narrow-field view includes the determined estimated coordinates of the game-object.

19. The system of claim 18, wherein dynamically moving the gaze of the attentive camera comprises determining homographies to back-project the estimated coordinates of the game-object in the wide-field view to a playing surface and re-projecting the game object to the narrow-field view of the attentive camera to determine the gaze in which the narrow-field view comprises the determined estimated coordinates of the game-object.

20. The system of claim 18, further comprising a smoothing module to smooth the tracked output video signal by minimizing acceleration of the movement of the attentive camera.

* * * * *